July 1, 1958 — R. R. PORTER — 2,841,465
RECOVERY OF URANIUM FROM SOLUTIONS THEREOF
Filed Sept. 8, 1950 — 2 Sheets-Sheet 1
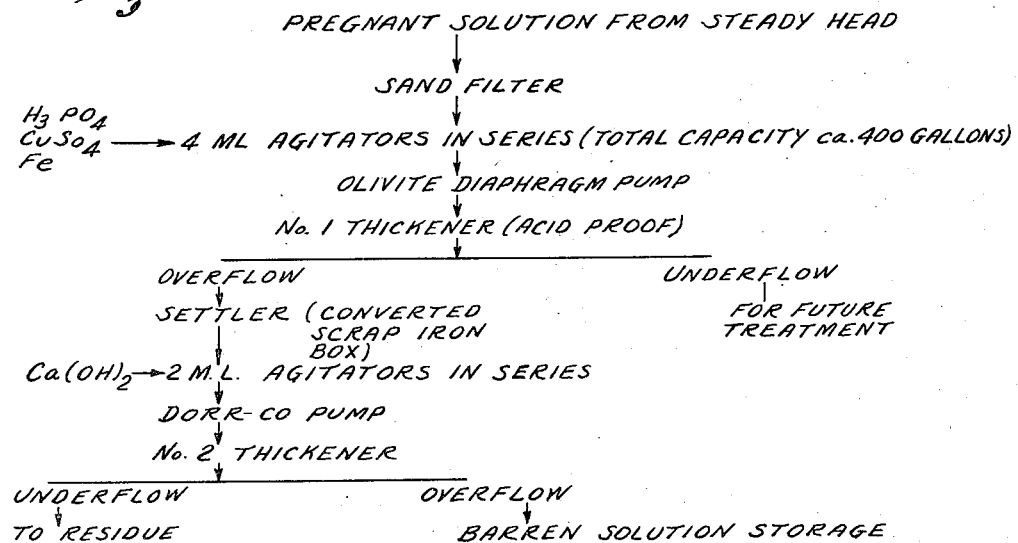
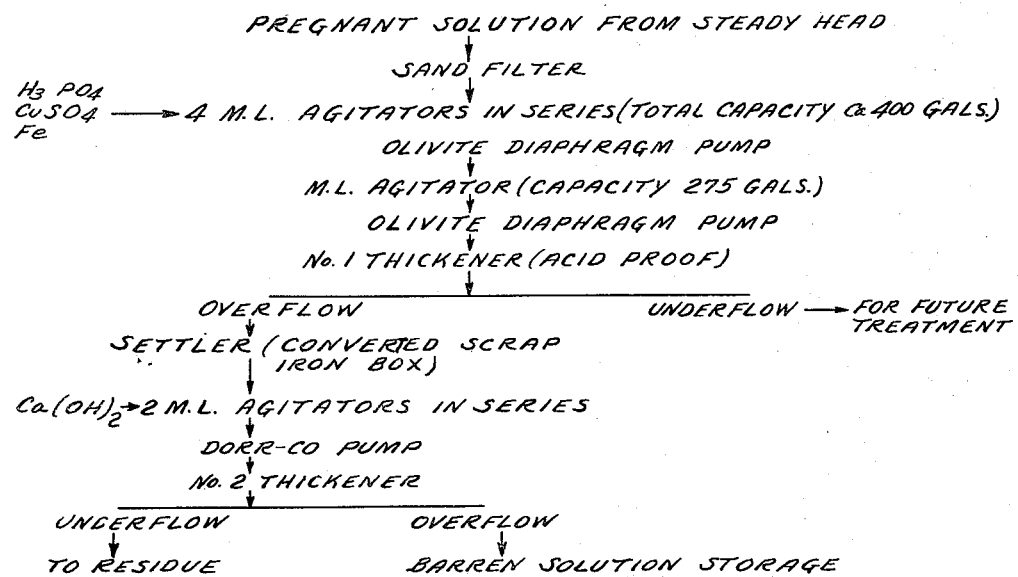
Inventor
ROBERT RAMPTON PORTER

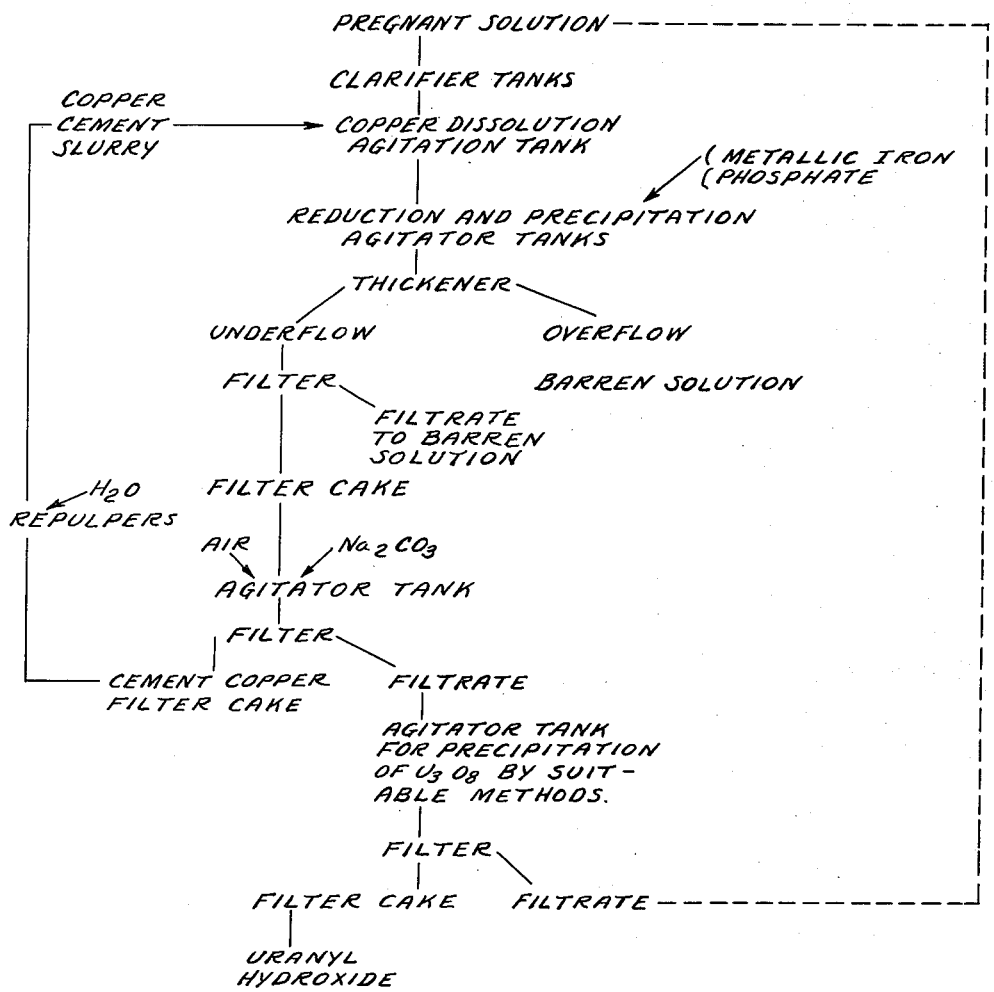

United States Patent Office 2,841,465
Patented July 1, 1958

2,841,465

RECOVERY OF URANIUM FROM SOLUTIONS THEREOF

Robert Rampton Porter, Johannesburg, Transvaal, Union of South Africa, assignor, by mesne assignments, to the Union of South Africa as represented by the Atomic Energy Board Application September 8, 1950, Serial No. 183,913

Claims priority, application Union of South Africa September 10, 1949

11 Claims. (Cl. 23—14.5)

This invention relates to the precipitation and recovery of uranium from solutions which contain a relatively large quantity of other elements such as aluminum, iron, silicon, manganese, calcium, cobalt, nickel, vanadium, zinc or cadmium, or in general elements which might be present in a solution which has been obtained from the acid and oxidizing leaching of uranium-bearing ores. These solutions are commonly encountered when the solvents for uranium consist of sulphuric acid and ferric sulphate.

Heretofore the recovery of uranium from such acid solutions has been accomplished by adding an alkali hydroxide, or oxide such as lime, hydrated magnesia, caustic soda or ammonia to the solution until an acidity value of pH 6.0 is reached. The uranium and many other elements are then co-precipitated as their respective hydroxides, and the resulting uranium product is badly contaminated with varying amounts of silica, alumina, copper, iron, vanadium and other elements whose chemical characteristics are such that they form insoluble compounds in the pH range from 2 to 6.0.

The recovery of uranium from such a product is costly, as it requires large quantities of acid to effect resolution of the uranium, together with the other components of the hydroxide precipitate, and then many complex chemical procedures are required to separate the uranium as a high grade product from the other elements which are present in the acid solution. This is particularly true if the original uranium precipitate was derived from a low grade ore.

Other methods of selectively precipitating uranium from low-grade uranium-bearing solutions have been tried but for the most part are costly, and give unsatisfactory recoveries when applied to solutions which contain small quantities of uranium accompanied by relatively large amounts of other elements.

It has now been found that if metallic iron is added to a uranium-bearing solution which was originally obtained from the leaching of ore, and the acidity of this solution is adjusted within the pH range of from 1.0 to 3.0 while in contact with the iron, there is a tendency for the uranium to be precipitated on the surface of iron as either a uranous phosphate or a uranous hydroxide. The precipitate thus formed for the most part is colloidal in character and is not easily recovered by either filtration or sedimentation methods. It has further been found, however, that if a small quantity of finely ground inert material such as ore is added to the solution before contact thereof with the metallic iron, and this material is then left in contact with said iron for a suitable length of time, the uranium precipitate which is formed in the solution is coagulated and it can be easily recovered by conventional methods. This action is more effective if the inert substance, the solution, and the iron are agitated by mechanical means.

My invention then broadly consists in the recovery of uranium from solutions of the kinds above referred to by a process involving—

(a) introduction into the solution of a finely divided adsorbent and/or inert or innocuous material followed by
(b) addition of metallic iron or other metallic reducing agent in a condition presenting a high superficial area to mass ratio;

in a pH range of the order of 0.5 to 3.5, with contact of the solution and its additions maintained for a considerable period of time and preferably promoted by agitation, the resultant solution and its precipitates being thereupon treated suitably for separation of the uranium-bearing precipitate economically in a high state of purity. The above stated pH range is applicable to solutions of the common kind which contain substantial percentages of silica, alumina and iron.

Other features of the invention, including the use of finely ground ore as the aforesaid inert or like material, the creation or promotion of conditions productive of the insoluble uranous phosphate especially before the reduction, the use of solutions having a copper content, and the recovery and possible cyclic re-use if desired of the finely subdivided material in further quantities of solution to be treated, will become apparent from the following description.

By applying this method of precipitation to low grade uranium solutions recoveries of over 95% of the uranium can be obtained, while the precipitate, after being freed of its metallic iron, contains as diluents only very small quantities of the impurities originally present in the "pregnant" solution or mother liquor. The uranium product, of course, is diluted with the finely divided inert material which was added in the capacity of a collector, but this does not interfere with the subsequent uranium recovery process.

The recovery of uranium from this material is very easily effected and much less costly than the treatment of precipitates formed by other precipitation methods, because in the treatment of the uranium precipitate produced in accordance with this invention, with acid and an oxidizing reagent or with sodium carbonate solution and air, the pulp may be separated into two components, one consisting of the inert material which was added to collect the uranium bearing precipitate, and the other consisting of high grade uranium solution which contains only a small quantity of impurities.

The uranium can be separated from these impurities in numerous ways, while the inert material can be discarded or if desired recycled back to the precipitation vessel.

As alternatives to iron in the capacity of a reducing agent herein, other metals may be used such as zinc, aluminum or others capable of effecting the reduction of the uranium from uranyl to uranous state. The iron or alternative metals are preferably used in a form presenting a high ratio of surface to mass e. g. in granulated or powdered form subject of course to freedom from oxidation.

Also in place of ore in the capacity of a collector there may be used kaolin, bentonite or diatomaceous earth. It has also been found that metals having highly adsorbent surfaces may be used. Thus the so-called "cement-copper" which is formed simultaneously with the reduction of the solution by the reducing agent is a highly effective adsorbent.

In the precipitation process the presence of phosphate in the original solution derived from the leaching of the ores is desirable, because of its tendency to form the insoluble uranous phosphate. The necessary amount of phosphate required to form this compound may be added to the solution before, during or after contact with the metallic iron or the like, but the quantity required need not exceed five times the molar ratio between uranium and phosphate ion for ordinary solutions in treatment.

Copper also may have some influence on the formation of the precipitate of uranium when the solution is reduced in the presence of metallic iron or other metal, because the analysis of the product obtained by the described method showed a substantial quantity of this element to be present either as a sulphide, oxide or metallic copper or in all three forms. This element was not added to the uranium-bearing solution, but was obtained during the leaching of the ore to obtain the uranium-bearing solution.

There is a possibility that the uranium compound precipitated in the presence of metallic iron may have the composition $CuU(PO_4)_2$ or may perhaps be in some of its hydrated forms. The copper content may be adjusted to obtain optimal conditions. The whole of the copper required may be made by addition to the solution.

The present invention is not, however, limited to any particular theory of action, but provides for the precipitation of uranium from solution in the presence of a metal reducing agent and an "inert" collector under certain pH conditions as hereinbefore indicated.

The invention is further described with reference to a number of experiments set forth in the following examples.

EXAMPLE 1

A solution obtained from the acid and ferric sulphate leaching of an ore containing only a small amount of uranium was subjected to precipitation treatment in the following manner.

A series of tests were conducted using a uranium-bearing solution having an anlysis of (grams per litre) 0.091 $U_3O_8$; 0.10 $PO_4$; 7.6 Fe; 0.84 $Al_2O_3$; 0.64 $SiO_2$. In each of the following tests 3 litres of solution were treated, and to each a variable amount of finely ground ore slime was added which ranged from nil in Test 1 to 6.6 grams per litre in Test 3. The solutions were then agitated for a period of 3 hours with 200 grams of detinned scrap iron which had been cut into long thin strips. After the agitation period the solution, with the finely divided ore and the uranium precipitate, was removed from the container and filtered, the filtrate being assayed for $U_3O_8$.

The results of the test are given in the following tabulations:

*Precipitation of $U_3O_8$ in the presence of metallic iron*

EFFECT OF VARYING ORE SLIMES

| Test No. | G.p.l. $U_3O_8$ in feed | G.p.l. $U_3O_8$ in Barren [1] Soln. | G.p.l. Ore Added | pH in feed Soln. | pH in Barren Soln. | Time of Contact with Fe, hours | Percent $U_3O_8$ Precipitated |
|---|---|---|---|---|---|---|---|
| 1 | 0.084 | 0.038 | Nil | 1.7 | 2.1 | 3 | 54.8 |
| 2 | 0.084 | 0.0125 | 3.3 | 1.7 | 2.1 | 3 | 85.2 |
| 3 | 0.084 | 0.0057 | 6.6 | 1.7 | 2.2 | 3 | 93.2 |

[1] "Barren Solution" indicates the solution obtained after filtration of the pulp obtained after contact with metallic iron and ground ore.

The beneficial effect of the ground ore in increasing the uranium recovery is readily apparent from the above tests.

The analysis of the "Barren Solution" obtained from Test 3 gave the following results, $Al_2O_3$ 0.84 g. p. l., $SiO_2$ 0.64 g. p. l., Fe 9.3 g. p. l.

These assays indicate that none of the major impurities in the solution were precipitated by the process. The increase in the iron assay was due to the dissolution of a small amount of the metallic iron by the acid during the reduction period.

EXAMPLE 2

A further series of tests using the same solutions as above were conducted. In these tests an additional amount of phosphate ion ($PO_4^{---}$) was added to the solution along with varying quantities of ground ore. In Tests 4 to 7, 5 molar parts of phosphate were added to the original solution before the addition of said solution to the scrap iron, which was contained in the agitating vessel. The amount of ground ore was varied and as indicated in the following table. In Tests 8 to 11 inclusive, the 5 molar parts of phosphate to 1 of uranium were added just prior to filtration of the pulp after it had received 3 hours contact with scrap iron.

The results obtained are given below:

*Precipitation of $U_3O_8$ in the presence of metallic iron, phosphate and varying quantities of ground ore*

| Test No. | Assay Feed G. p. l. $U_3O_8$ | Assay Barren Soln. G. p. l. $U_3O_8$ | Time of Contact with Fe, hours | G. p. l. Ore Added to Feed | $PO_4$ ion added-molar ratio $PO_4/U$ | pH feed Soln. | pH Barren Soln. | Percent $U_3O_8$ Precipitated |
|---|---|---|---|---|---|---|---|---|
| 4 [1] | 0.084 | 0.0035 | 4 | 3.3 | 5/1 | 1.7 | 2.0 | 95.8 |
| 5 [1] | 0.084 | 0.0047 | 4 | 6.6 | 5/1 | 1.7 | 1.9 | 94.4 |
| 6 [1] | 0.084 | 0.0084 | 4 | 13.3 | 5/1 | 1.7 | 1.9 | 90.0 |
| 7 [1] | 0.084 | 0.0062 | 4 | 20.0 | 5/1 | 1.7 | 1.9 | 92.6 |
| 8 [2] | 0.084 | 0.0091 | 4 | 3.3 | 5/1 | 1.7 | 1.9 | 89.2 |
| 9 [2] | 0.084 | 0.0090 | 4 | 6.6 | 5/1 | 1.7 | 1.9 | 89.3 |
| 10 [2] | 0.084 | 0.0048 | 4 | 13.3 | 5/1 | 1.7 | 1.9 | 94.3 |
| 11 [2] | 0.084 | 0.0045 | 4 | 20.0 | 5/1 | 1.7 | 1.9 | 94.6 |

[1] Phosphate added prior to contact with metallic iron.
[2] Phosphate added after contact with metallic iron.

The results obtained were very good and the indications are that a certain amount of ground ore can be replaced if phosphate is added to the solution before reduction with metallic iron. The effect of the addition of phosphate after reduction is not so apparent.

EXAMPLE 3

Tests on other solutions derived from the leaching of different ores for their uranium content were also carried out with equally good results. These tests are given in the following table. (The procedure followed being the same as that applied in Example 1 above):

*Use of precipitation method on other $U_3O_8$-bearing solutions*

| Test No. | Ore No. | G. p. l. $U_3O_8$ Feed Soln. | G. p. l. $U_3O_8$ Barren Soln. | Time of Contact with Fe, hours | pH of Feed Soln. | pH of Barren Soln. | Percent $U_3O_8$ Precipitated | G. p. l. ore added to Feed |
|---|---|---|---|---|---|---|---|---|
| 45 | 2 | 0.108 | 0.0058 | 4 | 1.9 | 2.0 | 94.6 | 12.0 |
| 52 | 3 | 0.300 | 0.0127 | 6 | 1.7 | 2.0 | 95.8 | 12.0 |

From the above results it is apparent that the invention is not limited or confined to the solution resulting from the treatment of any one particular ore or solution otherwise prepared and is on the other hand of wide application in uranium recovery by precipitation methods.

The following is an example of how the invention may be carried into effect on a substantial scale, the method being outlined briefly:

Copper sulphate, phosphoric acid and metallic iron were fed into the pregnant solution in a series of four agitators. The solution and precipitate was pumped into a thickener from which the overflow was returned to two more agitators, where lime was added to remove alumina and silica. The effluent from these agitators was pumped into a thickener, the clear overflow went to barren solution storage and the underflow was sent to residue. The underflow was measured and samples were taken to determine moisture and uranium content prior to disposal.

The cement copper precipitation data are divided into three periods. The flow sheet for Periods 1 and 2 is indicated in Fig. 1 of the accompanying sheet of drawing. In Fig. 2 the flow-sheet for Period 3 is given. It differs from that used in Periods 1 and 2 only in that an extra agitator has been incorporated. The data for these periods are presented in Tables IV, V and VI, while all precipitation data for the entire run are given in Table VIII.

*Table IV*

NO. 1 PERIOD

Tons pregnant solution treated _____ 225.83
Operating hours _____ 260
Lbs. solution treated per hour _____ 1737
Contact time in agitators—hours _____ 2.26
Lbs. $U_3O_8$ in pregnant solution _____ 53.1688
Lbs. $U_3O_8$ in barren solution (filtered) _____ 6.3752
Lbs. $U_3O_8$ in barren solution (unfiltered) _____ 8.2838
Percent precipitation _____ 88.01
Percent recovery _____ 84.42
S. G. of pregnant solution _____ 1.02

REAGENTS

Copper sulphate—lbs. Cu per 1000 lbs. solution _____ 0.82
Phosphoric acid—lbs. $PO_4$ per 1000 lbs. solution __ 0.56
Iron—lbs. iron per 1000 lbs. solution _____ 2.88

SOLUTION ANALYSES

|  | $Fe^{+++}$ g. p. l. | $Fe^{++}$ g. p. l. | Total Fe, g. p. l. | $H_2SO_4$, g. p. l. | pH | $U_3O_8$, g. p. l. |
|---|---|---|---|---|---|---|
| Pregnant solution | 1.9 | 3.9 | 5.8 | 3.2 | 2.1 | 0.1201 |
| Barren solution (filtered) | Nil | 8.0 | 8.0 | 3.0 | 2.3 | 0.0144 |

*Table V*

NO. 2 PERIOD

Tons pregnant solution treated _____ 127.77
Operating hours _____ 139
Lbs. solution treated per hour _____ 1838
Contact time in agitators—hours _____ 2.13
Lbs. $U_3O_8$ in pregnant solution _____ 25.6711
Lbs. $U_3O_8$ in barren solution (filtered) _____ 1.2065
Lbs. $U_3O_8$ in barren solution (unfiltered) _____ 2.7814
Percent precipitation _____ 95.30
Percent recovery _____ 89.17
S. G. of pregnant solution _____ 1.02

REAGENTS

Copper sulphate—lbs. Cu per 1000 lbs. solution _____ 0.74
Phosphoric acid—lbs. $PO_4$ per 1000 lbs. solution __ 0.32
Iron—lbs. iron per 1000 lbs. solution _____ 3.04

SOLUTION ANALYSES

|  | $Fe^{+++}$ g. p. l. | $Fe^{++}$ g. p. l. | Total Fe, g. p. l. | $H_2SO_4$, g. p. l. | pH | $U_3O_8$, g. p. l. |
|---|---|---|---|---|---|---|
| Pregnant solution | 1.8 | 3.6 | 5.4 | 3.1 | 2.2 | 0.1025 |
| Barren solution (filtered) | Nil | 7.8 | 7.8 | 2.3 | 2.6 | 0.0048 |

*Table VI*

NO. 3 PERIOD

Tons pregnant solution treated _____ 157.17
Operating hours _____ 170
Lbs. solution treated per hour _____ 1849
Contact time in agitators—hours _____ 3.61
Lbs. $U_3O_8$ in pregnant solution _____ 29.9552
Lbs. $U_3O_8$ in barren solution (filtered) _____ 1.6377
Lbs. $U_3O_8$ in barren solution (unfiltered) _____ 4.1104
Percent precipitation _____ 94.50
Percent recovery _____ 86.28
S. G. of pregnant solution _____ 1.02

REAGENTS

Copper sulphate—lbs. Cu per 1000 lbs. solution _____ 0.77
Phosphoric acid—lbs. $PO_4$ per 1000 lbs. solution __ 0.32
Iron—lbs. iron per 1000 lbs. solution _____ 3.61

SOLUTION ANALYSES

|  | $Fe^{+++}$ g. p. l. | $Fe^{++}$ g. p. l. | Total Fe, g. p. l. | $H_2SO_4$, g. p. l. | pH | $U_3O_8$, g. p. l. |
|---|---|---|---|---|---|---|
| Barren solution | 1.7 | 3.4 | 5.1 | 3.2 | 2.2 | 0.0972 |
| Barren solution (filtered) | Nil | 7.6 | 7.6 | 1.8 | 2.6 | 0.0053 |

Table VII

DATA FOR WHOLE PERIOD—CEMENT COPPER PRECIPITATION

| | |
|---|---|
| Tons of pregnant solution treated | 510.77 |
| Operating hours | 569 |
| Lbs. solution treated per hour | 1794 |
| Lbs. $U_3O_8$ in pregnant solution | 108.7951 |
| Lbs. $U_3O_8$ in barren solution (filtered) | 9.2194 |
| Lbs. $U_3O_8$ in barren solution (unfiltered) | 14.1756 |
| Percent precipitation | 91.53 |
| Percent recovery | 86.97 |
| S. G. of pregnant solution | 1.02 |

REAGENTS

| | |
|---|---|
| Copper sulphate—lbs. Cu per 1000 lbs. solution | 0.80 |
| Phosphoric acid—lbs. $PO_4$ per 1000 lbs. solution | 0.43 |
| Iron—lbs. iron per 1000 lbs. solution | 3.10 |

SOLUTION ANALYSES

| | $Fe^{+++}$ g. p. l. | $Fe^{++}$ g. p. l. | Total Fe, g. p. l. | $H_2SO_4$, g. p. l. | pH | $U_3O_8$, g. p. l. |
|---|---|---|---|---|---|---|
| Pregnant solution | 1.8 | 3.6 | 5.4 | 3.2 | 2.2 | 0.1086 |
| Barren solution (filtered) | Nil | 7.8 | 7.8 | 2.5 | 2.5 | 0.0092 |

In order to conserve reagents in the above process (copper precipitation process) a method of recycling back to the circuit the copper and phosphate has been evolved and used on large scale operations.

The process involves the treatment of the copper-uranium precipitate in a suitable method for its uranium removal, preferably a sodium carbonate leach treatment with air agitation which renders the $U_3O_8$ soluble and leaves as a residue the copper still in the metallic form. The residue is then returned to the main precipitation circuit where the action of ferric salts in the original solution is to dissolve the copper to again form copper sulphate thereby completing the cycle. This process is illustrated in the flow sheet shown on Fig. 3 of the drawings.

The results obtained from using this method of precipitation are set out briefly below:

| | |
|---|---|
| $U_3O_8$ content per 1000 lbs. pregnant solution | 0.210 |
| $U_3O_8$ content per 1000 lbs. barren solution | 0.010 |
| Percent precipitated | 95.3 |

Expendible reagent consumption for precipitation of copper-uranium product:

6 lbs. metallic iron per ton of solution treated.
0.5 lb. $H_3PO_4$ per ton of solution treated.

What I claim is:

1. A process for the recovery of uranium values from a uranium-bearing solution which contains other elements, which comprises introducing an adsorbent material selected from the group consisting of cement copper and an adsorbent slime into the said solution in a pH range of about 0.5 to 3.5, said adsorbent material being insoluble and indissoluble in said solution, adding in comminuted form and as a metallic reducing agent a metal which reduces uranium from the uranyl to the uranous state in acid solution, intimately admixing said solution and said additions with each other until uranium values in the solution are precipitated, and separating the resultant uranium-bearing precipitates from the solution.

2. A process according to claim 1, wherein the comminuted metallic reducing agent is selected from the group consisting of iron, zinc and aluminum.

3. A process according to claim 1, wherein the metallic reducing agent is iron in a comminuted form.

4. A process according to claim 1, wherein the adsorbent material is ore slime.

5. A process according to claim 1, wherein the adsorbent material is cement-copper.

6. A process according to claim 1, wherein the adsorbent material is cement-copper and the metallic reducing agent is comminuted iron.

7. A process according to claim 1, wherein the initial uranium-bearing solution comprises copper and phosphate ions and the metallic reducing agent is comminuted iron.

8. A process according to claim 1, wherein the initial uranium-bearing solution is obtained from the acid and ferric sulphate leaching of a uranium ore, wherein the adsorbent slime is ore slime and is added in an amount of about 3.3 to about 20.0 grams per litre of solution, wherein the reducing agent is de-tinned scrap iron in the form of long thin strips, and wherein the pH of the initial solution is about 1.7 to about 1.9.

9. A process according to claim 1, wherein the initial uranium-bearing solution is obtained from the acid and ferric sulphate leaching of a uranium ore, wherein the adsorbent slime is ore slime and is added in an amount of about 3.3 to 20.0 grams per litre of solution, wherein the reducing agent is de-tinned scrap iron in the form of long thin strips, wherein the pH of the initial solution is about 1.7 to about 1.9, and wherein 5 molar parts of phosphate ion are added to the solution per mol of uranium.

10. A process for the recovery of uranium values from a uranium-bearing solution, which comprises precipitating uranium values from said solution at a pH range of 0.5 to 3.5 in the presence in the solution of an adsorbent in the form of a slime which is insoluble and indissoluble in said solution, and of a metallic reducing agent, in comminuted metal form, which reduces uranium from the uranyl to the uranous state in acid solution, by intimately admixing said solution with said adsorbent slime and said reducing agent until the uranium values are precipitated, and separating the resultant uranium-bearing precipitates from the solution.

11. A process according to claim 10, wherein the solution also contains copper, and wherein the adsorbent is cement-copper and the reducing agent is comminuted iron.

References Cited in the file of this patent

UNITED STATES PATENTS

| | | |
|---|---|---|
| 890,584 | Fleck et al. | June 9, 1908 |
| 1,070,313 | Adams | Aug. 12, 1913 |
| 1,471,514 | Elliott | Oct. 23, 1923 |
| 1,495,538 | Thews | May 27, 1924 |

OTHER REFERENCES

MacTaggert: Chemical and Metallurgical Engineering, vol. 50, No. 7, pp. 178–181 (1943).